US00RE36593E

United States Patent [19]

Emery

[11] E Patent Number: Re. 36,593

[45] Reissued Date of Patent: Feb. 29, 2000

[54] PRODUCTION OF ANIONIC DETERGENT PARTICLES

[75] Inventor: William Derek Emery, Wirral, United Kingdom

[73] Assignee: Lever Brothers Company, New York, N.Y.

[21] Appl. No.: 09/336,117

[22] Filed: Jun. 17, 1999

Related U.S. Patent Documents

Reissue of:

[64] Patent No.: 5,856,294
Issued: Jan. 5, 1999
Appl. No.: 08/805,085
Filed: Feb. 24, 1997

[30] Foreign Application Priority Data

Feb. 26, 1996 [GB] United Kingdom ..... 9604000

[51] Int. Cl.[7] ..... C11D 11/00

[52] U.S. Cl. ..... 510/456; 510/357; 510/444

[58] Field of Search ..... 510/456, 457, 510/357, 444

[56] References Cited

U.S. PATENT DOCUMENTS

| | | | |
|---|---|---|---|
| 4,534,879 | 8/1985 | Iding et al. | 252/174 |
| 5,397,507 | 3/1995 | Bauer et al. | 252/549 |
| 5,427,717 | 6/1995 | Schisla et al. | 252/549 |
| 5,431,857 | 7/1995 | Capeci | 252/549 |
| 5,451,336 | 9/1995 | Schwadtke et al. | 252/89.1 |
| 5,490,954 | 2/1996 | Van der Hoeven et al. | 252/550 |
| 5,597,794 | 1/1997 | Bauer et al. | 510/457 |
| 5,629,275 | 5/1997 | Bauer et al. | 510/108 |
| 5,641,741 | 6/1997 | Emery et al. | 510/457 |
| 5,646,107 | 7/1997 | Emery et al. | 510/457 |

FOREIGN PATENT DOCUMENTS

| | | |
|---|---|---|
| 164 514 | 12/1985 | European Pat. Off. . |
| 340 013 | 11/1989 | European Pat. Off. . |
| 367 339 | 5/1990 | European Pat. Off. . |
| 390 251 | 10/1990 | European Pat. Off. . |
| 3902513 | 10/1990 | European Pat. Off. . |
| 420 317 | 4/1991 | European Pat. Off. . |
| 458 397 | 11/1991 | European Pat. Off. . |
| 506 184 | 9/1992 | European Pat. Off. . |
| 508184 | 9/1992 | European Pat. Off. . |
| 509 787 | 10/1992 | European Pat. Off. . |
| 572 957 | 12/1993 | European Pat. Off. . |
| 1 437 950 | 6/1976 | United Kingdom . |
| 1 470 250 | 4/1977 | United Kingdom . |
| 1 437 201 | 5/1977 | United Kingdom . |
| 1 473 202 | 5/1977 | United Kingdom . |
| WO 95/32276 | 11/1995 | WIPO . |
| WO 96/06916 | 3/1996 | WIPO . |
| 98/38278 | 9/1998 | WIPO . |
| 98/40461 | 9/1998 | WIPO . |

OTHER PUBLICATIONS

VRV S.p.A. Industrial Plants and Processes Manufacturing Brochure, date unavailable.

Lange, "Detergents and Cleaners, A Handbook for Formulators", Hanser Publishers, Munich, Vienna and New York, pp. 14–17, (1994).

*Primary Examiner*—Jacqueline V. Howard
*Attorney, Agent, or Firm*—Rimma Mitelman

[57] ABSTRACT

In a process for producing detergent particles comprising an anionic surfactant, a paste comprising water and the surfactant is fed to a drying zone where it is heated. Subsequently, the paste is cooled in a cooling zone. A layering agent is introduced into the cooling zone to improve granularity.

21 Claims, No Drawings

PRODUCTION OF ANIONIC DETERGENT PARTICLES

Matter enclosed in heavy brackets [ ] appears in the original patent but forms no part of this reissue specification; matter printed in italics indicates the additions made by reissue.

The present invention relates to anionic detergent particles, a process for their production and a composition containing them. More particularly the present invention relates to a process for the production of detergent particles having a high level of anionic surfactant which involves drying a detergent paste containing the anionic surfactant and to the particles thereby obtained.

Detergent-active compounds conventionally employed in detergent compositions include anionic surfactants e.g. linear alkylbenzene sulphonates (LAS), linear alkyl ether sulphate (LES) and primary alkyl sulphates (PAS), and nonionic surfactants e.g. alcohol ethoxylates. To improve detergency performance it is desirable to provide a high level of detergent-active material in the powder.

Often, the maximum level of active that may be incorporated is limited by process requirements. Detergent compositions having a high bulk density are typically prepared by a process involving mixing or granulation of components of the composition and/or a base powder obtained for example from a spray-drying process and provide significant consumer benefits as compared to compositions of lower bulk density.

It is known to incorporate detergent active compounds into such compositions in liquid form. However as it is necessary to control the ratio of liquids to solids in order to form detergent granules the maximum level of detergent active material which may be incorporated in this manner is limited. It is also known to incorporate anionic surfactant e.g. LAS or PAS in detergent compositions by means of a solid adjunct, that is, a particle comprising the surfactant and other components of the composition e.g. sodium carbonate and builder. Hitherto, the level of anionic surfactant present in such adjuncts has been limited due to the need to provide good flow properties and reduce the tendency to agglomerate.

EP-A-506 184 discloses a process for the continuous dry neutralisation of liquid acid precursor of anionic surfactant. Detergent particles having an active detergent content of 30 to 40% by weight may be prepared by this process.

EP-A-572 957 discloses a process for producing a powdery anionic surfactant by feeding an aqueous slurry of the surfactant containing 60 to 80% solids into an evaporator, forming a film of the surfactant on the reactor wall and scraping it from the wall whilst drying and concentrating the slurry.

It is disclosed in EP-A-572 957 that the reactor wall is at a temperature of 50° to 140° C.; 130° C. is the highest wall temperature exemplified. Higher temperatures are said to cause thermal degradation and colour tone change and are thus disadvantageous. Furthermore, this document discloses that the blades in the reactor are operated to provide a tip speed of preferably 2 to 20 m/s, with 10.5 m/s being the highest tip speed which is exemplified. Bulk densities of up to about 0.5 g/cm$^3$ are disclosed.

However, contrary to the latter teaching and as disclosed in our PCT Patent Application No. PCT/EP95/03321 (unpublished before the priority date of the present application), detergent particles having a high bulk density, a high level of anionic surfactant and excellent powder properties may be produced by heating a paste containing the surfactant in a first zone at an even higher temperature and then cooling the thus formed particles.

In general, the aforementioned process involves feeding a paste material comprising water in an amount typically of more than 10% by weight of the paste and the anionic surfactant into a drying zone. The paste material is heated in the drying zone to reduce the water content and subsequently cooled in a cooling zone to form detergent particles.

The process described in our unpublished application is especially applicable to the use of PAS as the anionic detergent component of the particles. Unfortunately, the greater the amount of LAS in the anionic component, the greater is the tendency for the granules to form with a sticky surface with is deleterious to the requirement to produce dry uniform granules in the final product.

It has now been discovered that this problem can be solved by importing a layering agent into the cooling zone.

EP-A-390 251 discloses use of a layering agent as a granulation aid in the production of detergent granules wherein components are treated in a high speed mixer and then maintained in, or brought into a deformable stage in a moderate speed mixer.

Thus, a first aspect of the present invention provides a process for producing detergent particles comprising an anionic surfactant, the process comprising the steps of feeding a paste material comprising water and an anionic surfactant into a drying zone, heating the paste material in the drying zone to reduce the water content thereof and subsequently cooling the paste material in a cooling zone to form detergent particles, characterised by introducing a layering agent into the cooling zone during the cooling step.

Instead of using the layering agent, the same effect can be achieved by treating the paste in the cooling zone with a cooling gas. Thus, a second aspect of the present invention provides a process for producing detergent particles comprising an anionic surfactant, the process comprising the steps of feeding a paste material comprising water and an anionic surfactant into a drying zone, heating the paste material in the drying zone to reduce the water content thereof and subsequently cooling the paste material in a cooling zone to form detergent particles, characterised by treating the paste material in the cooling zone with a stream of cooling gas.

The cooling gas needs to be generally dry and may for example be air or nitrogen, e.g. below 0° C. The cooling gas may be applied as a counter-current gas stream.

However, the present invention is not limited only to compositions where the anionic component comprises or consists of LAS. It is also beneficial for use with other anionics including PAS or LES.

The layering agent may be any material capable of coating the particles at the cooling stage, to improve the granularity thereof. Relatively inert materials are preferred for this purpose but especially any of those inert materials which have a beneficial effect in the wash liquor, for example, aluminosilicates, silicas talcs and clays. A mixture of such materials may be used. Examples of aluminosilicates and silicas are outlined in more detail hereinbelow. The presence of any such material as a coating on the finished particles does not preclude the presence also of the material within the body of the particles.

Relative to the total other materials of the particles, the dosing weight ratio of the layer materials in the cooling step is preferably from 1:3 to 1:20, more preferably from 1:9 to 1:20.

The drying zone may optionally be under a slight vacuum to facilitate the removal of water and volatiles. The vacuum may be from 100 Torr up to atmospheric pressure as this provides significant process flexibility. However, a vacuum in excess of 500 Torr up to atmospheric has the advantage of reducing capital investment whilst providing vacuum operation.

Control of residence time and particle size may be secured and process throughput may be increased by agitating the material in the drying and/or cooling zone.

The process is preferably continuous as this facilitates continuous transportation of the particles. In a continuous process the flow rate of the paste is suitably of the order of 10 to 25 kg/m$^2$/hr and preferably 17 to 22 kg/m$^2$/hr e.g. 20 kg/m$^2$/hr.

Suitably the average residence time in the drying zone is less than 5 minutes. A residence time of less than 4 minutes is especially preferred with as low a residence time as possible being most preferred, to reduce the possibility of decomposition (especially with PAS) and maximise product throughput.

Agitation of the paste in the heating zone generally provides efficient heat transfer within the paste and facilitate removal of water. Agitation reduces the contact time between the paste particles and the wall of the drying zone which, together with efficient heat transfer, reduces the likelihood of "hot spots" forming which may lead to decomposition. Moreover, improved drying is secured thus allowing a shorter residence time/increased throughput in the drying zone.

In the case of PAS, to avoid thermal decomposition, the paste material is preferably not heated to a temperature in excess of 170° C.

The process of the present invention permits the formation of particles having a high bulk density for example in excess of 550 g/cm$^3$.

The material is cooled in a cooling zone which is suitably operated at a temperature not in excess of 50° C. and preferably not in excess of 40° e.g. 30° C. Desirably there is agitation within the cooling zone to provide efficient cooling of the material therein. By actively cooling the particles, the possibility of thermal decomposition occurring due to the particles being heated to a higher temperature than previously disclosed, is reduced and the tackiness of the particles may be reduced. Such active cooling may be through circulation of, for example, cold water or chilled water (e.g. glycol water at ca −5° C.) around the cooling zone, for example, in a cooling jacket.

The paste material preferably comprises a mixture of anionic surfactant and water although the other components may be present if desired or carried through as impurities from an up-stream process, for example production of the surfactant. Preferably the paste material comprises at least 60% by weight, more preferably at least 65% and especially at least 70% by weight of anionic surfactant. Suitably the paste comprises no more than 50% and preferably no more than 30% by weight of water. The paste material should be pumpable at the temperature at which it is to be fed into the drying zone and this may limit the maximum level of surfactant present therein.

When the anionic comprises PAS, the paste is suitably fed to the drying zone at a temperature of 50° to 70° C. and preferably 50° to 65° C.

The process of the invention may be carried out in any suitable apparatus. However, it is preferred to use a scrape surface drier and especially, a flash reactor. Suitable flash reactors include e.g. the Flash Drier system available from VRVSpA processi Impianti Industriali. The ratio of drying zone heat transfer area to cooling zone heat transfer area is typically from 3:1 to 1:1, e.g. about 2:1.

Optionally two or more drying zones may be employed before the cooling zone as desired. A single apparatus may be employed to provide the drying zone and cooling zone as desired or alternatively separate apparatus for example a drier and a cooling fluid bed may be employed.

Suitably the drying zone is substantially circular in cross section and is thus defined by a cylindrical wall. Preferably the said wall is heated by means of a heating jacket through which water, steam or oil may be fed. The inside of the said wall is preferably maintained at a temperature of at least 130° C. and especially at least 140° C. Preferably the drying zone has an evaporation rate of 3 to 25, and especially 5 to 20 kg water per m$^2$ of heat surface per hour.

The cooling zone is preferably defined by a cylindrical wall. Where the process is continuous, the apparatus is suitably arranged such that the drying zone and cooling zone are substantially horizontally aligned to facilitate efficient drying, cooling and transport of the material through the drying and cooling zones in a generally horizontal direction.

Suitably the drying zone and preferably the cooling zone have agitation means therein which agitates and transports the surfactant paste and forming granules through the said zones. The agitation means preferably comprises a series of radially extending paddles and/or blades mounted on an axially mounted rotatable shaft. Desirably the paddles and/or blades are inclined in order to effect transportation and preferably have a clearance from the inner wall of nor more than 10 mm, for example 5 mm.

We have found that the present invention has especial applicability in the production of high quality detergent particles comprising LAS which would otherwise be unobtainable by previously known processes. However, the anionic component may also be in the form of PAS, LES or any other anionic surfactant and mixtures of these with or without LAS.

LAS is most usually commercially available in the form of the free acid. Unlike PAS acid which is extremely unstable, LAS acid is very stable and sold commercially by a number of suppliers, for example Petralab 550 (Petresa), Deter (Deter), Marlican (Huls), Nalkylene 540L (Vista) and Isorchem L83 (Enichem). It is provided as a viscous liquid that is easily handled, stored and processed. In any event, the paste in the drying zone may be formed by feeding a liquid anionic precursor of the anionic surfactant and a neutralising agent to the drying zone or an entry zone for the drying zone and forming the anionic surfactant in-situ.

Neutralised LAS acid is commercially available as a powder.

LAS powders are mainly either drum or spray dried and can have reasonable powder properties when fresh. However they are less preferred because they can absorb moisture from the atmosphere and become sticky and difficult to handle. Their flow deteriorates and they become prone to caking. Typical powders that are available (ex Huls) are Marlan ARL (80% LAS), Marlan A390 (90% LAS), Marlan A396 (96% LAS), or (ex Unger) Ufaryl DL90 (90% LAS), Ufaryl DL85 (85% LAS), and Ufaryl DL80 (80% LAS).

PAS is presently available on the market in fine powder form or in noodle form. The fine powder is generally dusty, having a significant quantity of particles of less than 150 microns. PAS noodles are generally produced by extruding dried PAS which has the appearance of soap chips and typically have a very large particle size and a very low porosity leading to poor dissolution characteristics. To increase the level of detergent active material in a detergent composition it is known to post-dose detergent particles to provide a composition having a high level of active material.

However, PAS in fine powder form and PAS noodles are generally not suitable for post-dosing into a detergent composition as the composition particles and the post-dosed particles are generally of different particle size and thus tend to segregate and be unsightly. The process according to the present invention enables detergent particles having a high level of detergent active material and suitable porosity and particle size characteristics to be obtained.

Accordingly, a third aspect of the invention provides detergent particles comprising at least 60% by weight of the particle of an anionic surfactant, preferably comprising or consisting of LAS, and not more than 5% by weight of the particle of water, the particles being coated with a layering agent obtainable by a process according to the first or second aspect of the invention.

According to a fourth aspect of the invention there is provided detergent particles comprising an anionic surfactant, preferably comprising or consisting of LAS and preferably in an amount of at least 60% by weight of the particle, wherein the particles are coated with a layering agent and have a porosity of from 0% to 25% by volume of the particle and a particle size distribution such that at least 80% of the particles have a particle size of 180 to 1500 microns, preferably 250 to 1200 microns and less than 10% and preferably less than 5% of the particles have a particle diameter less than 180 $\mu$m.

Suitably the anionic surfactant in the detergent particles is present in an amount of at least 70% preferably of at least 80% and desirably at least 85% by weight of the particles. It is desirable that the particles also comprise water in an amount of 0 to 8% and preferably 0 to 4% by weight of the particles. The water in the particle provides improved granule integrity thus reducing the level of the fine particles.

Desirably the detergent particles have an aspect ratio not in excess of 2 and more preferably are generally spherical in order to reduce segregation from other particles in a formulated detergent composition and to enhance the visual appearance of the powder.

Preferably, any LAS anionic surfactant has a chain length of from $C_8$ to $C_{16}$, preferably from $C_9$ to $C_{15}$ and most preferably a narrow range of from $C_{10}$ to $C_{14}$.

If present, any PAS surfactant has a chain length of $C_{10}$ to $C_{22}$ preferably $C_{12}$ to $C_{18}$ and more preferably to a narrow range of $C_{12}$ to $C_{14}$, Coco PAS is particularly desirable.

The detergent particle may comprise mixtures of PAS with other surfactants and/or non surfactant components as desired.

Suitable other surfactants may comprise linear alkyl ether sulphates, oxo alcohol sulphates for examples $C_{11}$ to $C_{15}$ and $C_{13}$ to $C_{15}$ alcohol sulphates, secondary alcohol sulphates and sulphonates, unsaturated surfactants for example sodium oleate, oleyl sulphates, olefin sulphonate, or mixtures thereof.

Especially preferred are LAS rich particles, that is particles in which the amount of LAS exceeds the amount of any other surfactant or non-surfactant and more preferably exceeds the total amount of all other surfactant and non-surfactant components.

Generally the sodium salt of the surfactants will be employed, however K, Ca or Mg salts may also be present. However, it is preferred to form the anionic component by feeding the acid form of the anionic surfactant and a neutralising agent to the drying zone or an entry zone immediately before the drying zone and forming the anionic surfactant in-situ.

If the in-situ formation of anionic is performed in the drying zone the heat of neutralisation evolved in the drying zone reduces the requirement for external heating of the drying zone and is advantageous over processes in which surfactant paste is employed as a feedstock.

Moreover, it is advantageous if the precursor acid may be fed to the drying zone in liquid form rather than as an aqueous solution and the neutralising agent may be concentrated. The total amount of water introduced into the drying zone may be reduced significantly as compared to processes in which a surfactant paste is employed. Such pastes may require at least 30% by weight of water in order to be pumpable.

It is also possible to form the detergent particles prior to dosing of the layer agent, directly from a precursor acid feedstock rather than as a two step process involving production of the surfactant and subsequent formation and drying of a paste to form the detergent particles. This is advantageous as the need to produce a surfactant paste, which can present technical difficulties, is avoided as is the need for transport and storage of the paste.

The precursor acid, for example LAS or PAS acid, is suitably fed to the drying zone in the liquid phase. As the precursor acid may be thermally unstable, the neutralisation preferably occurs sufficiently rapidly and substantially completely such that thermal decomposition of the acid due to the elevated temperature is minimised and desirably avoided.

The precursor acid is suitably fed at a temperature of 40° to 60° C. to ensure it is in the liquid form but without encouraging thermal decomposition. The neutralising agent may be fed into the drying zone at any desired temperature.

Suitably the neutralising agent is introduced as an aqueous solution or slurry or solid material. Conventional neutralising agents may be employed including alkali metal hydroxides for example sodium hydroxide and alkali metal carbonates, for example sodium carbonate, ideally added as a solid material.

Suitably the neutralising agent is present in an amount of 25 to 55% and preferably a 30 to 50% by weight of the aqueous solution or slurry. A high concentration of the neutralising agent may give unwanted crystallisation and a low concentration is undesirable due to the large proportion of water.

The concentration of the neutralising agent solution or slurry may be varied in order to control the water content in the drying zone. Thus, optimum viscosity characteristics may be attained whereby the material in the drying zone remains transportable/pumpable.

A stoichiometric excess of neutralising agent with respect to the acid precursor may be employed. The excess neutralising agent combines with acid, for example sulphuric acid which may be produced if part of the precursor acid thermally decomposes.

Using in-situ neutralisation, rapid throughput can be obtained as compared to a process in which a paste containing a pre-neutralised surfactant is employed.

Agitation of the precursor and neutralising agent (hereinafter referred to as the feedstocks) in the heating zone generally provides efficient heat transfer and facilitate removal of water. Agitation reduces the contact time between the feedstocks and the wall of the drying zone which, together with efficient heat transfer, reduces the likelihood of "hot spots" forming which may lead to thermal decomposition. Moreover, improved drying is secured thus allowing a shorter residence time/increased throughput in the drying zone.

Other non-surfactant components which may be present in the detergent particles include dispersion aids, preferably polymeric dispersion aids and more preferably urea, sugars, polyaklyleneoxides; and builders as hereinafter described.

If desired the detergent particles may comprise an organic and/or inorganic salt, e.g. a hydratable salt. Suitable materials in salts, preferably sodium, of tripolyphosphate, citrates, carbonates, sulphates, chlorides. Aluminosilicates, clays, silicas and other inorganic materials may also be included.

The particles may also contain one or more nonionic surfactants, for example as mentioned below in the context of a base powder with which the particles are admixed.

Similarly, organic materials, e.g. PEG and other polymer builder or soap may also be included in the particles, also as mentioned below in the latter context.

It is especially preferred that a salt be present in the particle when the anionic surfactant component comprises LAS.

The salt may be present at a level of up to 50% and preferably up to 30% by weight of the particles.

The detergent particles may be post-dosed directly to a base powder obtained from any conventional detergent production process including a non tower process in which the components of the detergent composition are mixed and granulated as described e.g. in EP-A-367 339 and a spray drying process optionally followed by a post tower densification. As the detergent particles produced by the present invention may be post-dosed to such powders a significant degree of formulation flexibility is obtained and the level of active material in the fully formulated composition may be very high as desired. A further advantage is that a base powder which is substantially free of detergent active compounds may be produced as the detergent active compounds may be introduced substantially wholly as post-dosed particles.

Accordingly a further aspect of the invention provides a detergent composition comprising detergent particles according to the third or fourth aspects of the invention and a base powder.

The option of reducing the level of detergent active material in a base powder is especially advantageous where the base powder is produced by a spray drying process as a lower level of detergent active compound in the spray drying process permits a higher throughput to be secured thus increasing overall production efficiency.

Compositions according to the present invention may also contain, in addition to the detergent-active compound, a detergency builder and optionally bleaching components and other active ingredients to enhance performance and properties.

Detergent compositions of the invention may contain, in addition to the post-dosed detergent particles, one or more detergent-active compounds (surfactants) which may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch. The preferred detergent-active compounds that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of C8–C15; primary and secondary alkyl sulphates, particularly C12–C15 primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethyxylated with an average of from 1 to 20 moles ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

The total amount of surfactant present in the detergent composition is suitably from to 5 to 40 wt % although amounts outside this range may be employed as desired.

The detergent compositions of the invention generally also contain a detergency builder. The total amount of detergency builder in the compositions is suitably from 10 to 80 wt %, preferably from 15 to 60 wt %. The builder may be present in an adjunct with other components or, if desired, separate builder particles containing one or more builder materials may be employed.

Inorganic builders that may be present include sodium carbonate, if desired in combination with a crystallisation seed for calcium carbonate, as disclosed in GB-A-1 437 950; crystalline and amorphous aluminosilicates, for example zeolites as disclosed in GB-A-1 473 201; amorphous aluminosilicates as disclosed in GB-A-1 473 202; and mixed crystalline/amorphous aluminosilicates as disclosed in GB 1 470 250; and layered silicates as disclosed in EP-B-164 514. Inorganic phosphate builders, for example, sodium, orthophosphate, pyrophosphate and tripolyphosphate, may also be present, but on environmental grounds those are no longer preferred.

Aluminosilicates, whether used as layering agents and/or incorporated in the bulk of the particles may suitably be present in a total amount of from 10 to 60 wt % and preferably an amount of from 15 to 50 wt %. The zeolite used in most commercial particulate detergent compositions is zeolite A. Advantageously, however, maximum aluminium zeolite P (zeolite MAP) described and claimed in EP-A-384 070 may be used. Zeolite MAP is an alkali metal aluminosilicated of the P type having a silicon to aluminium ratio not exceeding 1.33, preferably not exceeding 1.15, and more preferably not exceeding 1.07.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. A copolymer of maleic acid, acrylic acid and vinyl acetate is especially preferred as it is biodegradable and thus environmentally desirable. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %. The builder is preferably present in alkali metal salt, especially sodium salt, form.

Suitably the builder system comprises a crystalline layered silicate, for example, SKS-6 ex Hoechst, a zeolite, for example, zeolite A and optionally an alkali metal citrate.

Detergent compositions according to the invention may also contain a bleach system, desirably a peroxy bleach compound, for example, an inorganic persalt or organic peroxyacid, capable of yielding hydrogen peroxide in aqueous solution. The peroxy bleach compound may be used in conjunction with a bleach activator (bleach precursor) to improve bleaching action at low wash temperatures. An especially preferred bleach system comprises a peroxy bleach compound (preferably sodium percarbonate optionally together with a bleach activator), and a transition metal bleach catalyst as described and claimed in EP 458 397A and EP-A-509 787.

The compositions of the invention may contain alkali metal, preferably sodium, carbonate, in order to increase detergency and ease processing. Sodium carbonate may suitably be present in an amount from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate polymer, or sodium silicate which is suitably present in an amount of from 1 to 5 wt %.

The materials that may be present in detergent compositions of the invention include sodium silicate; corrosion inhibitors including silicates; antiredeposition agents such as cellulosic polymers; fluorescers; inorganic salts such as sodium sulphate, lather control agents or lather boosters as appropriate; proteolytic and lipolytic enzymes; dyes; coloured speckles; perfumes; foam controllers; and fabric softening compounds. This list is not intended to be exhaustive.

The base composition is suitably prepared by spray-drying a slurry of compatible heat-insensitive ingredients, and then spraying on, admixing and/or postdosing those ingredients unsuitable for processing via the slurry. The detergent particles produced according to the process of the present invention are post-dosed to the base composition by conventional methods.

Detergent compositions of the invention preferably have a bulk density of at least 500 g/l, more preferably at least 550 g/liter.

Such powders may be prepared either by spray-drying, by post-tower densification of spray-dried powder, or by wholly non-tower methods such as dry mixing and granulation. A high-speed mixer/granulator may advantageously be used for such mixing. Processes using high-speed mixer/granulators are disclosed, for example, in EP-A-340 013, EP-A-367 339, EP-A-390 251 and EP-A-420 317.

The invention will now be explained in more detail by way of the following non-limiting Examples.

Processing

A 1.2 $m^2$ VRV machine was used, having three equal jacket sections. Dosing ports for both liquids and powders were situated just prior to the first hot section, with mid-jacket dosing ports available in the final two sections. Zeolite was added via this port in the final section. An electrically-powdered oil heater provided the heating to the first two jacket sections, with oil temperatures between 120° C. and 190° C. being used. Ambient process water at 15° C. was used for cooling the jacket in the final section. Make-up air flow through the reactor was controlled between 10 and 50 $m^3$ /hr by opening a bypass on the exhaust vapour extraction fan. All experiments were carried out with the motor at full speed, giving a tip speed of about 30 m/sec.

A mono pump was calibrated to dose ambient temperature LAS acid, and a peristaltic pump was calibrate to does the 47% sodium hydroxide. Screw feeders were calibrated to dose both sodium carbonate and zeolite A24 for layering. The sodium carbonate and the liquids were added just prior to the first hot section, and the zeolite layering was added into the third section which was cold. The minimum level of zeolite was added to give free flowing granules leaving the drier.

In these Examples, the following abbreviations apply:
D(4,3)=Weighted average mean particle diameter;
DFR=dynamic flow rate;
UCT=uncompacted compression test.

EXAMPLE 1

LAS Acid and Sodium Hydroxide

Experiments were carried out at various throughputs and jacket temperatures. Some of the machine parameters and powder properties are shown in Table 1. Zeolite layering was necessary in all of the examples shown below

TABLE 1

| SAMPLE | JACKET TEMP | ESTIMATED THROUGHPUT KG/HOUR | BULK DENSITY | DFR | % COMP | UCT | D (4, 3) MICRONS | <180 MICRONS | >1400 MICRONS |
|---|---|---|---|---|---|---|---|---|---|
| A | 170° C. | 37.9 | 621 | 142 | 4.1 | 0.0 | 845 | 1.58 | 8.2 |
| B | 178° C. | 65.2 | 617 | 130 | 4.7 | 0.0 | 1116 | 3.32 | 33.2 |
| C | 178° C. | 76.0 | 576 | 129 | 5.3 | 0.0 | 1351 | 1.11 | 49.82 |
| D | 178° C. | 91.9 | 463 | 101 | 17.6 | 0.0 | 1522 | 0.0 | 78.81 |
| E | 178° C. | 41.9 | 599 | 128 | 12.4 | 0.25 | 869 | 2.96 | 14.44 |

Sample A had excellent powder properties with a reasonable mean particle size. The flow properties of these powders were exceptional considering that all contain around 90% LAS. As the throughput was increased samples B to D shared a slight reduction in flow, coupled with an increase in particle size. This increase in particle size was due to a higher residual moisture content within the granules. As the throughput was reduced in E, the flow was improved and the particle size decreased.

Without the use of zeolite layering it would have been impossible to make any of the above powders.

EXAMPLE 2

LAS Acid and Solid Sodium Carbonate

Experiments were carried out at various degrees of neutralisation of the sodium carbonate. Some of the machine parameters and powder properties are shown in Table 2. Zeolite layering was necessary in all of the examples shown below.

TABLE 2

| SAMPLE | JACKET TEMP | ESTIMATED THROUGHPUT KG/HOUR | % $NA_2CO_3$ CONVERTED | BULK DENSITY | DFR | % COMP | UCT | D (4,3) MICRONS | <180 MICRONS | >1400 MICRONS |
|---|---|---|---|---|---|---|---|---|---|---|
| A | 145° C. | 42.7 | 42 | 624 | 131 | 5.9 | 0.0 | 812 | 1.47 | 6.25 |
| B | 145° C. | 57.6 | 63 | 594 | 140 | 7.6 | 0.0 | 946 | 0.3 | 6.57 |
| C | 145° C. | 64.9 | 73 | 597 | 131 | 11.2 | 0.0 | 849 | 0.29 | 4.64 |
| D | 145° C. | 72.2 | 83 | 601 | 141 | 7.1 | 0.0 | | | |

The level of water evaporation in these experiments was low, as no water was added. The water originated mainly from the water of neutralisation of the LAS acid. As a result, a lower jacket temperature of 145° C. was used. A fixed flow of sodium carbonate powder was used, together with increasing levels of LAS acid, to coincide with degrees of neutralisation of LAS acid ranging from 42% up to 83%, as shown in Table 3.

All of the powders produced have excellent flow properties and reasonable mean particle sizes. As the degree of neutralisation increased, and the throughput increased, there was no deterioration in the powder properties.

Without the use of zeolite layering it would have been impossible to make any of the above powders.

In the light of this disclosure, modifications of the described examples as well as other examples, all with the scope of the present invention as defined by the appended claims, will now become apparent to persons skilled in this art.

I claim:

1. A process for producing detergent particles comprising an anionic surfactant, the process comprising the steps of feeding a paste material comprising water and an anionic surfactant into a scrape surface drier comprising a drying zone, heating the paste material in the drying zone for an average residence time of less than 5 minutes to reduce the water content thereof and subsequently cooling the paste material in a cooling zone operated at a temperature not in excess of 50° C. to form detergent particles, characterized by introducing a layering agent into the cooling zone during the cooling step.

2. A process for producing detergent particles comprising an anionic surfactant, the process comprising the steps of feeding a paste material comprising water and an anionic surfactant into a scrape surface drier comprising a drying zone, heating the paste material in the drying zone for an average residence time of less than 5 minutes to reduce the water content thereof and subsequently cooling the paste material in a cooling zone operated at a temperature not in excess of 50° C. to form detergent particles, characterized by treating the paste material in the cooling zone with a stream of cooling gas.

3. The process according to claim 1, wherein the anionic surfactant comprises a linear alkylbenzene sulphonate.

4. The process according to claim 2, wherein the anionic surfactant comprises a linear alkylbenzene sulphonate.

5. The process according to claim 3, wherein the linear alkylbenzene sulphonate comprises from 10% to 100% by weight of the total anionic surfactant.

6. The process according to claim 4, wherein the linear alkylbenzene sulphonate comprises from 10% to 100% by weight of the total anionic surfactant.

7. The process according to claim 4, wherein the paste material comprises no more than 50% by weight of water.

8. The process according to claim 2, wherein the paste material comprises no more than 50% by weight of water.

9. The process according to claim 1, wherein the layering agent comprises an aluminosilicate, a silica or a mixture thereof.

10. The process according to claim 2, wherein the layering agent comprises an aluminosilicate, a silica or a mixture thereof.

11. The process according to claim 1, wherein the layering agent is dosed into the cooling zone at a weight ratio of from 1:5 to 1:20 relative to the finished particles.

12. The process according to claim 1, wherein the anionic surfactant is formed by admixture of the free acid form of the anionic surfactant and a neutralising agent.

13. The process according to claim 2, wherein the anionic surfactant is formed by admixture of the free acid form of the anionic surfactant and a neutralising agent.

14. The process according to claim 1, wherein the resultant particles comprise at least 75% by weight of the anionic surfactant and no more than 10% by weight of water.

15. The process according to claim 2, wherein the resultant particles comprise at least 75% by weight of the anionic surfactant and no more than 10% by weight of water.

16. The process according to claim 1, wherein the resultant particles have a D(4,3) average particle diameter of from 180 to 1500 microns.

17. The process according to claim 2, wherein the resultant particles have a D(4,3) average particle diameter of from 180 to 1500 microns.

18. Detergent particles comprising at least 60% by weight of the particle of an anionic surfactant, and not more than 5% by weight of the particle of water, the particles being coated with a layering agent obtainable by a process according to any preceding claim.

19. Detergent particles comprising an anionic surfactant, in an amount of at least 60% by weight of the particle, wherein the particles are coated with a layering agent and have a porosity of from 0% to 25% by volume of the particle and a particle size distribution such that at least 80% of the particles have a particle size of 180 to 1500 microns.

20. The particles according to claim 18, wherein the anionic surfactant comprises a linear alkylbenzene sulphonate.

21. The particles according to claim 19, wherein the anionic surfactant comprises a linear alkylbenzene sulphonate.

* * * * *